Sept. 29, 1953  C. D. DOSKER  2,653,890
METHOD OF PROCESSING WOOD
Filed Jan. 18, 1950

INVENTOR.
Cornelius D Dosker
BY Arthur J. Robert
Attorney

Patented Sept. 29, 1953

2,653,890

UNITED STATES PATENT OFFICE 2,653,890

METHOD OF PROCESSING WOOD

Cornelius D. Dosker, Louisville, Ky., assignor to Gamble Brothers, Inc., Louisville, Ky., a corporation of Kentucky Application January 18, 1950, Serial No. 139,209

2 Claims. (Cl. 154—125)

This invention relates to a process of laminating wood, and more particularly to a process of preparing the surface of wood prior to its lamination.

The history of the laminating of wood shows that the condition of the surfaces of the woods to be brought together is all-important. In the early developments when timbers having relatively rough surfaces, such as those direct from the saw, were brought together with glue or a similar adhesive and pressure was applied, the resultant film of glue was not uniform because of the irregularities of the contacting surfaces. In some areas, the glue would be in a relatively thin layer and in others, as where surfaces might be slightly recessed, the glue would form in pockets. The same type of joint resulted when attempts were made to increase the surface of the wood as by a toothing plane. Consequently, the joint would not be firm and was unsatisfactory. To overcome this difficulty, the surfaces of the timbers to be joined were brought to a smooth, level finish as by planing. This method has proven satisfactory and is conventional practice today. However, it involves a waste of wood as high as 25%.

In overcoming the disadvantages of the prior art, it is an object of my invention to provide a method of laminating wood wherein relatively rough-surfaced wood such as that direct from the saw can be processed into laminated wood without any intermediate working such as planing and without any waste of wood.

Another object of my invention is the provision of a novel method of preparing wood surfaces for laminating wherein the surface of the wood is formed as a relatively pliable mass that adapts itself to irregularities in the wood surfaces when the laminated assembly is subjected to pressure, resulting in a relatively uniformly thin layer of glue between the wood masses.

Referring to the accompanying drawings.

Figure 1:
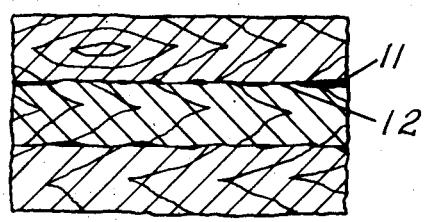
Fig. 1 represents a portion of a laminated section wherein the surfaces of the laminated layers have not been prepared in any manner but have been taken direct from the saw.

In the laminated product of Fig. 1 wherein the wood surfaces have been taken as is from the saw, the relatively rough surfaces form areas of thick and thin glue layers as shown at 11 and 12, respectively. A thick bond as shown at 11 is a weak bond and will result in an unsatisfactory product as the bond will not hold. The same condition develops where portions of the wood have been removed to form grooves as with a toothing plane.

Figure 2:
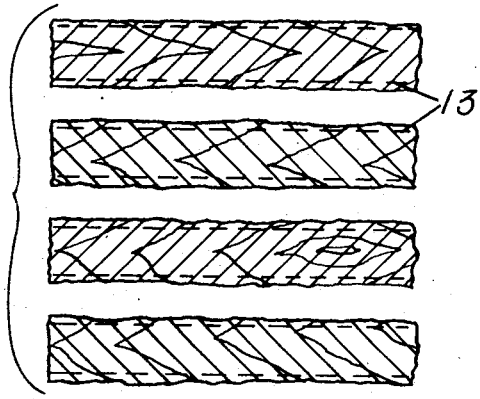
Fig. 2 illustrates a plurality of laminations as prepared by present practice wherein approximately 25% of the wood is removed in planing.
Figure 3:
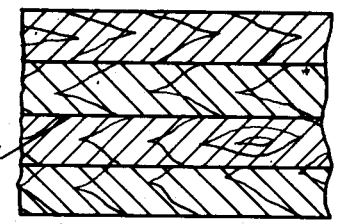
Fig. 3 represents the final laminated product formed from the timbers of Fig. 2.

Fig. 2 represents four pieces of wood with sawn surfaces. In the present day practice of forming planed surfaces prior to lamination, the surfaces of the layers are removed to the extent indicated in broken lines 13, the result being an approximate waste of 25% of the wood. Thus while a relatively thin and even bond 14 is secured between the several laminations, an additional lamination is required to produce a resultant board of the same thickness of that of Fig. 1, as shown in Fig. 3.

In the method of the present invention, the stock which may have relatively rough surfaces such as that taken direct from the saw without an intervening working, is opened, pin-pointed or likewise penetrated on the surfaces to be joined, as by grooved rollers, in a manner to form a series of parallel relatively close grooves 15 extending generally in the direction of the grain or by other means such as suitably shaped pins to form openings independent of the direction of the grain, the principal features being (1) no material interruption of the surface of the wood, (2) no removal of the wood as when a toothing plane is used, and (3) the development of compression normal to the plane of the opening and in the plane of the wood surface. When rollers are used, they are preferably formed with knives of a shape to form grooves rising from a relatively sharp edge 16 below the surface of the wood generated by convex walls 17 and terminating in rounded lands 18 substantially flush with the plane of the original surface of the wood. No wood is removed and there is no waste. When pins or equivalent means are used, the recesses are formed with relatively sharp pointed ends within the wood rising by convex walls to the surrounding rounded raised areas.

The openings or recesses, however made, are of insufficient depth to materially interrupt the surface of the wood, being about 3/32" to 1/8" deep, depending to some extent on the types of wood and of the resin to be used, and the thickness of the laminations. The cutting action in forming the recesses and the depth of the recesses relative to the thickness of the wood apparently are such that the longitudinal end grains adjacent the surface of the wood are opened to form capillary-like tubes to receive the adhesive. The recesses are sufficiently close together so that a uniform network of such end grains is exposed.

In addition to the actual penetration, the means used, such as the grooving roller, develops compression forces substantially in the plane of the wood surface, the result being that the lands 18 are compressed horizontally as viewed in the drawings, apparently producing a partial crushing and mashing of the fibers and a loosening of the binding structure of the wood which provides more surface openings and makes for a better bond. In addition, this fiber disruption renders the lands or areas intermediate the recesses somewhat pliable and flowable to a limited extent as will be later explained.

I have found that if the wood is lightly wetted with a wetting agent such as water during the operation, a better bond is secured. This is apparently due to the wetted fibers being more pliable and swelling to some extent, thereby further disrupting the fiber structure and rendering the surface more amenable to the reception of the bonding material. By making the surface of the wood more pliable, it is less liable to "pickup" during grooving. By "pickup" is meant the tendency for the grooving roller to catch and peel away lands between the grooves in the form of narrow strips, leaving a wide groove or recess in the wood surface. The wetting is sufficiently light to increase the moisture content only very slightly.

Figures 6, 7:
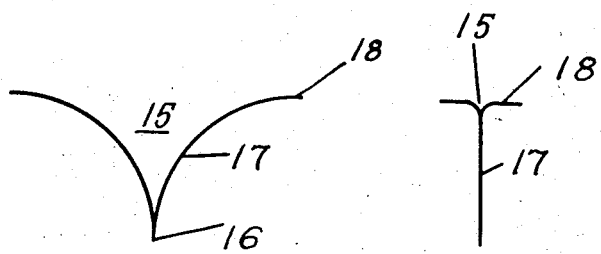
Fig. 6 is an enlarged diagram of the recess formed in the timbers of Fig. 4.
Fig. 7 is an enlarged diagram of the recess of Fig. 6 after the adhesive such as glue has been applied.

After the foregoing preparation, glue or another suitable bonding medium is applied to the surfaces to be joined. By reason of the recesses and the fiber-disrupted character of the surface, the glue penetrates to some extent immediately. It has been found that the glue causes the recesses 15 to take the form shown in Fig. 7 and almost disappear, the intermediate disrupted areas swelling to an extent to bring the convex walls 17 into contact as shown. The result is a surface closely comparable with the original surface except that the surface is formed of what might be described as a plastic and somewhat "flowable" mass consisting of disrupted fibers interspersed with bonding material. By disruption, I do not means a severance from the main body of the timber but rather a breaking up or loosening of the fiber structure adjacent the surfaces, the structure still being secured to the underneath wood, so as to form a raised resilient pad.

Figure 5:
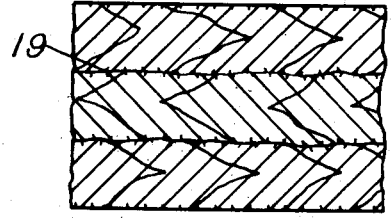
Fig. 5 represents the final laminated product formed from the timbers of Fig. 4.

After the application of the adhesive, the layers are assembled in the manner shown in Fig. 5 and subjected to heat and pressure, the latter being of a degree sufficient to cure the glue, and bring the assembly to the desired final dimension. The layers may be assembled with the grains in line or at angles to one another. While the surfaces of the timbers may be considered relatively rough at this stage as compared with a planed surface, and non-complementary in shape, I have found that upon the application of the requisite pressure, the surfaces actually appear to be plastic and to "flow" to a limited extent, the elevated areas of one surface seeking the recessed areas of the opposing surface with the final result that although the line of juncture as shown at 19 may not be a straight line as is the case with the line 14 of Fig. 3, the bond is formed in a relatively thin uniform layer as shown in Fig. 5 and not in alternate thick and thin areas as is the case in Fig. 1. The resultant bond is stronger than that of Fig. 3 because the adhesive has to some extent become interlaced and locked with the adjacent surface fibers which is not possible with planed surfaces.

Figure 4:
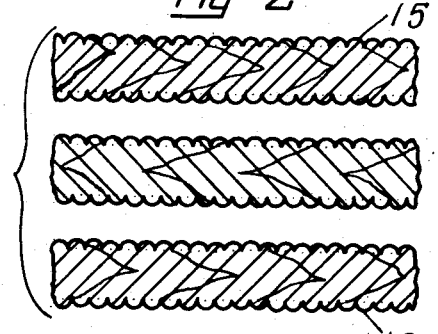
Fig. 4 represents a plurality of laminations prepared according to my invention.

Inasmuch as the final product of Fig. 5 is of substantially the same thickness as the aggregate of the elements of Fig. 4, the waste of timber has been entirely eliminated as compared with the waste of approximately 25% when the surfaces are planed. For example, only three elements of a certain thickness are required to form the product of Fig. 5, whereas four elements of the same certain thickness are required to form the product of Fig. 3, both products being of the same final thickness.

As shown in Fig. 5, the recesses disappear entirely as regards the surface of the laminations with the application of heat and pressure. This is true also in the case of the outer surfaces which may, if desired, be impregnated with a suitable resin, afterwards cured, by the application of heat and surface pressure according to the method disclosed in my abandoned application for Method of Processing Wood, S. N. 620,591, filed October 5, 1945, in which case a relatively hard finish is secured, and in my application Serial No. 738,028, filed March 29, 1947, for Method of Processing Unfinished Wood Surfaces Into Impregnated Finished Surfaces, now abandoned.

In Fig. 4, I have shown the outer surfaces of the outside laminations recessed the same as the inner surfaces. This is more convenient as a practical matter as it enables all the timbers to be processed through the same machine, and has not been found detrimental to the final surfaces, the recesses substantially disappearing under the applied heat and pressure. However, it is to be understood that the outside laminations may be recessed on only one side rather than both sides.

It will be appreciated that this invention is applicable to relatively thick pieces of wood such as lumber, and the plywood equivalent thereof, as distinguished from veneer. In accordance with my invention, sawn or rough surfaced lumber may be laminated with either smooth or rough surface lumber. Where a rough surface is bonded to a smooth surface, only the rough surface needs to be treated in accordance with this invention. My process for treating such surface includes the step of indenting the entire wood surface to be treated with a multiplicity of closely spaced shallow and narrow openings, which are cross-sectionally defined by convex walls diverging outwardly from a sharp bottom point and terminating at the surface in narrowly spaced rounded lands, and simultaneously compressing the wood between adjacent openings to form said rounded lands and at the same time loosen the fiber structure thereof so as to change the entire fiber structure of the indented surface into a uniform and absorbent shallow network of interconnected fibers while leaving the wood underneath this network with its fibers intact.

With the surface prepared in this manner, the application of an adhesive to each processed surface will cause the loosened fibers to swell so as to substantially close the recesses and also form a raised resilient pad of loosened fibers extending more or less continuously over the processed surface. As a consequence, when the wood to be laminated is placed in the laminated relationship and compressed, the resilient pads are compressed into uniform engagement throughout the entire processed surface. In other words, there are now no localized areas which are out of contact and within which pools of adhesive may collect. This uniform contact results in a good bond and, with the use of appropriate adhesives, the bonded surfaces are not subject to variation as a result of moisture content in the wood. The important advantage of this method of treatment is that it enables laminated wood to be prepared direct from relatively rough-surfaced unplaned stock such as sawn stock. The raised resilient pads overcome the non-uniformity in the original surfaces of such stock which has heretofore prevented their direct lamination without an intervening planing operation.

This is a continuation in part of my abandoned application, Serial Number 620,592, filed October 5, 1945.

Any of the well-known and widely-used wood bonding agents may be employed. These are applied in an unset or uncured condition, the board assembled into laminated relationship with their bondable surfaces in face to face contact and pressure applied and held while the bonding agent sets or cures. However, I prefer the use of thermo-setting resinous solutions, such as: aqueous solutions of urea, alkyd, phenolic-formaldehyde and melamine resins; and alcoholic solutions of phenolic-formaldehyde resin and other suitable resins.

Having described my invention, I claim:

1. In the art of producing laminated lumber, the process of bonding at least two rough-surfaced unplaned wooden boards together comprising: indenting each rough wooden surface to be bonded with a multiplicity of closely spaced shallow and narrow openings, which are cross-sectionally defined by convex walls diverging outwardly from a sharp bottom point and terminating at the surface in narrowly spaced rounded lands, and simultaneously compressing the wood between adjacent openings to form said rounded lands and at the same time loosen the fiber structure thereof so as to change the entire fiber structure of the indented surface into a uniform and absorbent shallow network of interconnected fibers while leaving the wood underneath this network with its fibers intact; applying to each indented surface an unset wood bonding agent to impregnate said network and to cause the loosened fibers thereof to swell and substantially close said openings; assembling the boards into laminated relationship with said impregnated surfaces in face to face contact; and applying mechanical pressure to hold said laminae firmly together while the bonding agent sets.

2. In the art of producing laminated lumber, the process of bonding at least two rough-surfaced unplaned wooden boards together comprising: indenting each rough wooden surface to be bonded with a multiplicity of closely spaced shallow and narrow openings, which are cross-sectionally defined by convex walls diverging outwardly from a sharp bottom point and terminating at the surface in narrowly spaced rounded lands, and simultaneously compressing the wood between adjacent openings to form said rounded lands and at the same time loosen the fiber structure thereof so as to change the entire fiber structure of the indented surface into a uniform and absorbent shallow network of interconnected fibers while leaving the wood underneath this network with its fibers intact; applying to each indented surface a solution of a thermo-setting resin to impregnate said network and to cause the loosened fibers thereof to swell and substantially close said openings; assembling the boards into laminated relationship with said impregnated surfaces in face to face contact; applying mechanical pressure to compress said laminae firmly together; and maintaining said pressure while the resin cures.

CORNELIUS D. DOSKER.

References Cited in the file of this patent

UNITED STATES PATENTS

| Number | Name | Date |
|---|---|---|
| 206,534 | Brock | July 30, 1878 |
| 1,433,077 | Hansen | Oct. 24, 1922 |
| 2,409,785 | Newmark et al. | Oct. 22, 1946 |
| 2,413,500 | Hummel | Dec. 31, 1946 |

FOREIGN PATENTS

| Number | Country | Date |
|---|---|---|
| 193,552 | Switzerland | Oct. 31, 1937 |